United States Patent
Bhave et al.

[11] Patent Number: 5,851,137
[45] Date of Patent: *Dec. 22, 1998

[54] COATER DIE EDGE FINISHING METHOD

[75] Inventors: Aparna V. Bhave, Woodbury; William B. Kolb, St. Paul; Thomas M. Milbourn, Mahtomedi; Lawrence B. Wallace, Newport; Robert A. Yapel, Oakdale, all of Minn.

[73] Assignee: Minnesota Mining and Manufacturing Company, St. Paul, Minn.

[ * ] Notice: The term of this patent shall not extend beyond the expiration date of Pat. No. 5,655,948.

[21] Appl. No.: 871,460

[22] Filed: Jun. 9, 1997

Related U.S. Application Data

[63] Continuation of Ser. No. 462,807, Jun. 5, 1995.

[51] Int. Cl.⁶ ........................................ B24B 1/00
[52] U.S. Cl. ........................ 451/28; 451/529; 451/534
[58] Field of Search ........................ 451/123, 296, 451/528, 534, 539, 533, 63, 152, 28

[56] References Cited

U.S. PATENT DOCUMENTS

| | | | |
|---|---|---|---|
| 2,447,003 | 5/1948 | Bieberich | 451/123 |
| 2,450,077 | 9/1948 | Bieberich | 451/123 |
| 4,043,080 | 8/1977 | Maxwell | 451/123 |
| 4,240,232 | 12/1980 | Chwae . | |
| 4,287,749 | 9/1981 | Bachrach et al. | 72/467 |
| 4,426,954 | 1/1984 | Keller . | |
| 4,444,628 | 4/1984 | Furukawa et al. | 204/29 |
| 4,625,592 | 12/1986 | Bayens | 76/107 C |
| 4,644,703 | 2/1987 | Kaczmarek et al. | 451/533 |
| 4,936,052 | 6/1990 | Nagase et al. | 451/152 |
| 5,307,593 | 5/1994 | Lucker et al. | 451/63 |
| 5,336,322 | 8/1994 | Tobisawa et al. | 118/410 |
| 5,358,193 | 10/1994 | Madsen et al. | 242/342 |
| 5,377,927 | 1/1995 | Erickson et al. | 242/346 |
| 5,454,844 | 10/1995 | Hibbard et al. | 51/295 |
| 5,484,629 | 1/1996 | Ghosh et al. . | |
| 5,655,948 | 8/1997 | Yapel et al. | 451/28 |

FOREIGN PATENT DOCUMENTS 0 559 465 A1  9/1993  European Pat. Off. .
WO 94/15718  7/1994  WIPO .

*Primary Examiner*—Timothy V. Eley
*Assistant Examiner*—Derris H. Banks
*Attorney, Agent, or Firm*—Charles D. Levine

[57] ABSTRACT

A method of microfinishing the edge of a die component includes polishing the edges after the die component is machined by known methods to finish the edges of the die component to a smoother finish than the rest of the die component. This eliminates the incidence of undesirable streaking defects in the coating. The polishing step can be lapping, vapor honing, or grit blasting. The edges are polished to a finish of less than 8 microinches.

13 Claims, 3 Drawing Sheets

COATER DIE EDGE FINISHING METHOD

This is a continuation of application Ser. No. 08/462,807 filed Jun. 5, 1995.

TECHNICAL FIELD

The present invention relates to manufacturing die components. More particularly, the present invention relates to finishing die components.

BACKGROUND OF THE INVENTION

Known coater die component methods of manufacture call for an 8 to 16 microinch finish on all of the ground surfaces, and unbroken, deburred edges at the die lips. The die components are ground along their length to minimize formation of a "sawtooth" pattern on the coating edges which would lead to catastrophic levels of streaking. The die component edges can be deburred by hand if necessary, possibly with a non-woven material or a suitable sharpening stone. There is no further micropolishing. The die component edges are ground to the same finish as the rest of the component. This does not always lead to sufficiently polished surfaces and causes streaking in the coating of products. Even freshly ground dies made by the best known methods can still produce streaks.

SUMMARY OF THE INVENTION

A method of microfinishing the edge of a die component includes polishing the edges after the die component is machined by known methods to finish the edges of the die component to a smoother finish than the rest of the die component. This eliminates the incidence of undesirable streaking defects in the coating.

The polishing step can be lapping, vapor honing, or grit blasting. The edges are polished to a finish of less than 8 microinches.

In one embodiment, the polishing step includes lapping the die component edge while wetting the edge with oil. This is done by traversing the die component edge along its length with lapping film by creating relative motion between the edge and the lapping film. Polishing is performed to a degree sufficient to minimize streak formation without overpolishing and rounding the die component edges. The angle of attack between the edge and the lapping film can be varied to allow a complete polish of the edge, and sequential polishing of the edge faces can be used.

The invention is also a die component for coating that has an edge that is polished to a finish of less than 8 microinches.

DETAILED DESCRIPTION

This invention is a method of preparing die coaters, such as extrusion coaters including plain extrusion coaters, knife coaters, slot fed knife coaters, slide coaters, fluid bearing coaters, flow bars for gravure or roll coaters, and diefed kiss transfers. The method includes micropolishing the edges of the coater die that directly contact the coater bead. The micropolished edges of the die are straight, smooth, and free of any irregularities or asperities which can lead to downweb lines, streaks, and die lines. The finished edges can be round or beveled. Also, the method includes polishing die edges that contact coating fluid away from any bead, such as the edge of a die slot adjacent a slide surface.

Any suitable polishing, such as lapping, vapor honing, grit blasting, and other methods, can be used to polish the edges after the die is machined by any procedure. This method finishes the die at the lip edges to a much smoother finish than the rest of the die to eliminate the incidence of undesirable streaking defects, such as die lines, in the coating. The die lip edges are finished, by micropolishing, to less than 8 microinches (known coater die finishing methods create an 8 to 16 microinch finish on the ground surfaces). The various sides of the die that form the edges can be polished separately to optimize the polishing while avoiding unnecessary rounding of any of the edges. This maintains the coating performance of the die, such as by allowing pinning of the contact line between the coating fluid and the die, while reducing streaking. (The finish, or roughness, is the finely spaced surface-texture irregularities resulting from the manufacturing process. The roughness, also known as the roughness-height index value, is a number that equals the arithmetical average deviation of the minute surface irregularities from a hypothetical perfect surface, expressed in microinches.)

Figure 1:
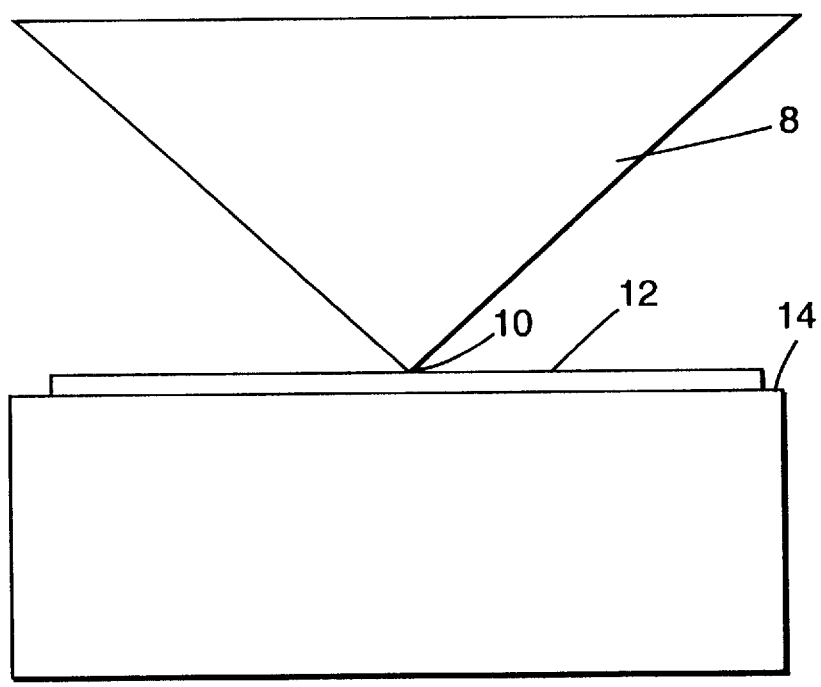
FIG. 1 is a cross-sectional view of a die edge being polished according to the present invention.

One method, shown in FIG. 1, involves micropolishing the edge of the die with lapping film. The lapping film can be 3M Imperial Lapping Film from Minnesota Mining and Manufacturing Company, St. Paul, Minn., in grades of about 1 micron or finer. The die edge is lapped, while being wetted with oil, by traversing the die edge along its length with the lapping film. For dies that are small enough, the lapping film itself could be attached to a flat surface (such as a granite table) and the die can be reciprocated along its length. In either case, the angle of attack of the edge to the lapping film can be varied to allow a complete polish of the edge. The polishing should be done extensively enough to minimize streaks, but care should be taken not to overpolish, which would overly round the die edge and impair coater performance.

Figure 2:
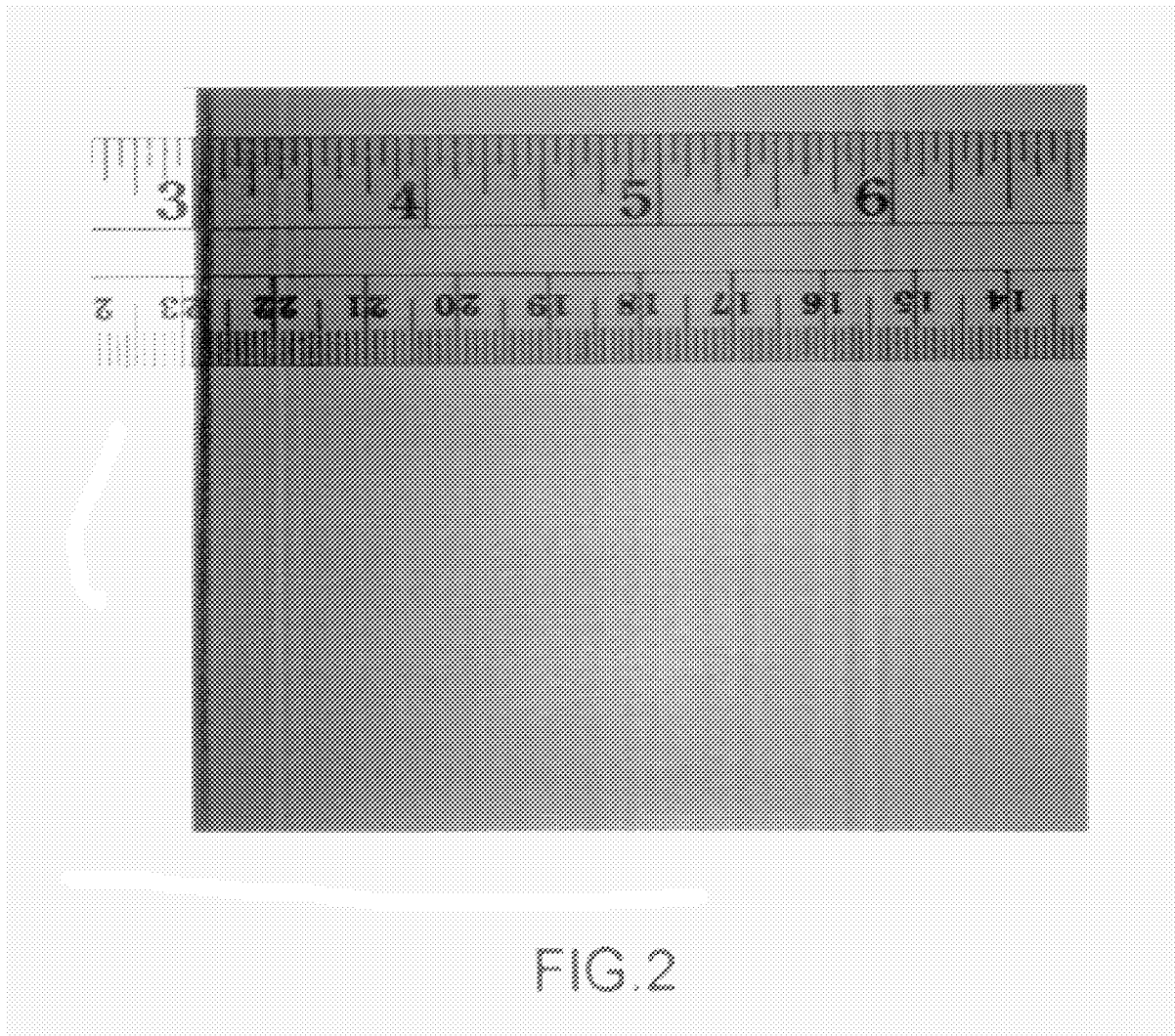
FIG. 2 is a view of a coated product using a known die and showing streaking.
Figure 3:
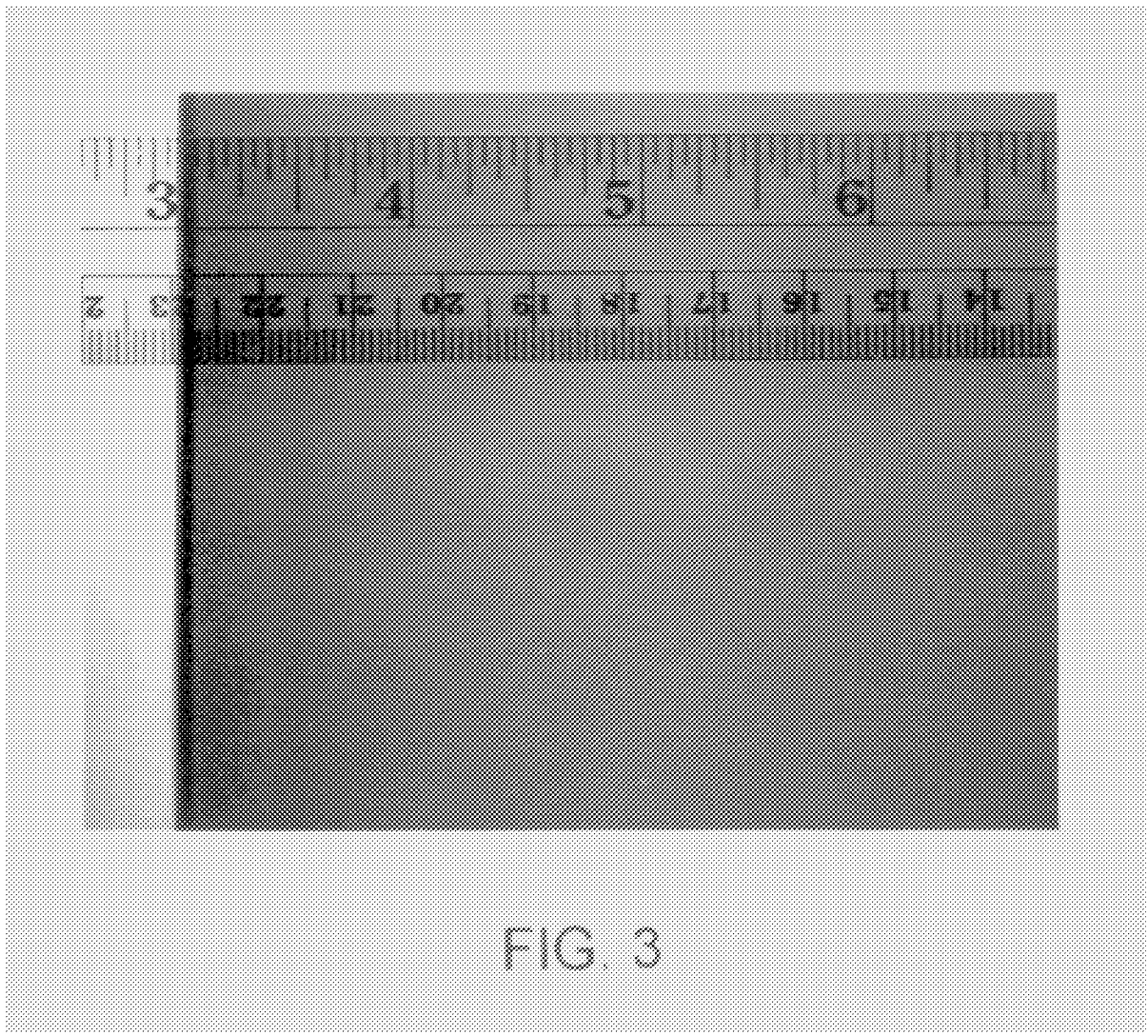
FIG. 3 is a view of a coated product made using the present invention.

As shown in FIG. 1, the edge 10 of the die component 8 is polished by placing the lapping film 12 on a flat surface 14 and either reciprocating the die edge, reciprocating the lapping film 12, or reciprocating both, in a direction in and out of the figure (along the length of the die edge). FIGS. 2 and 3 compare the quality of a coated web when coated with a grind finished standard edge (FIG. 2) and with a polished edge (FIG. 3). The coating prepared with the grind finished standard edge exhibits streaks. The coating prepared with the polished edge of this invention does not.

Also, the die edges can be polished in two or more successive steps. For example, the edges could be polished first to a coarse finish using 1 micron grade or larger lapping film, then to an intermediate finish using 0.3 micron grade lapping film, and finally to a fine finish using 0.05 micron grade or smaller lapping film. Additional initial steps of polishing with very course finishes of 20, 50, 100 micron, and larger grade lapping films can also be performed. Also, die edges with a compound angle can be finished. For example, the angle at the die edge tip could be 90° (as evident only under large magnification) while the remainder of the die edge could form an acute angle. Any combination of acute, obtuse, and right angles can be polished while maintaining sharp edges at each angle. Also, a plurality (approaching an infinite number) of planar surfaces can be polished to approximate a rounded surface, if tolerated by the product.

Tests have shown that lapping more than the edges of the die, such as into the die slot, will not further improve coating performance and would not reduce streaking. Thus, over-polishing all of the surfaces of the die is not necessary. It is a feature of this invention, to finish the die edges finer than the rest of the die.

This method of micropolishing eliminates defects in die edges that are too small to see with the naked eye or feel and can eliminate defects that are sometimes too small to see under a microscope. For example, in many situations with photochemical coatings (which use high viscosity coating fluids), examination of the coated film without photographically imaging the film would not reveal the presence of a coating defect without using inspection systems that would create unacceptable down time and product loss; this means that there is little chance to find a coating defect and avoid selling defective film to customers. In the development of this invention, the inventors recognized that even these extremely small defects in die edges can affect coating quality, particularly with sensitive photochemical coatings.

It was not recognized before this invention, nor would it have been obvious, that such small defects were a concern. For example, in many applications, slight defects could cause a streak at the die edge, but the coating surface would level downstream, making the product acceptable. However, in other applications, especially with sensitive photochemical coatings, the interdiffusion of functional components and the lack of leveling at the layer interface result in streak defects in the functional product. Thus, even though the surface of the coating fluid levels, it is not apparent that streaks would appear when imaging, making the product unacceptable. Also, because the results of the microfmnishing are not visible except under very large magnification, it is not apparent that this method would improve coating quality involving larger streaks.

This method greatly reduces the number and intensity of coating streaks caused by non-uniformities in the die edge lip. This is of particular importance with the coating of fluids composed of solutions of polymeric components, especially at concentrations that result in shear viscosity greater than 2–5 poise, because of reduced settling rate of the streaks that results in greater sensitivity to streaking.

The following example illustrates the advantage of this method in minimizing die edge induced streaking. In this example, a single layer die constructed of 15-5 PH SST was used. The coating liquid was a solution containing Butvar B79 polymer with a shear viscosity of 10 poise at a shear rate of 65 $sec^{-1}$, and a surface tension between 23–30 dyne/cm at 31–51% solids. The solution was coated on 2 mil polyester web.

The streak levels were recorded using a visualization technique with a point source of light placed behind the web at a distance d from the web and at a location just after coating in a span immediately after the backup roll. On the other side of the web, a translucent screen was placed at a distance d/2 from the web on the face side so the transmitted light was projected through the coating and onto the screen. A ruler was placed on the screen to record the length scale. (1 cm along the width of the actual coating corresponds to 1.5 cm on the screen.) The screen image was then recorded using a video camera system. (Only a portion of the 4 inch coated width along one edge was visualized.) In the first run, the die was a standard grind finished die. As shown in FIG. 2, there is extensive downweb streaking. Repeated tests with the same die components, after stopping coating, wiping the die face clean, (and even completely disassembling and reassembling the die) and resuming coating, yields the identical streak pattern, indicating that the streaks are caused by the mechanical finish of the die components, particularly the subtle non-uniformities on the die lip edges. Next, the die top piece was removed, and polished using lapping paper (3M 262 X Imperial Lapping Film A/O 3 mil sheets, 1 micron grade) attached to a flat granite slab. The die top was reassembled to the die body with the same setup and coating solution as before, and coated. The resultant visualized image is shown in FIG. 3. The streaking in the coating is nearly eliminated.

We claim:

1. A method of microfinishing the edge of a coating die used for coating a liquid on a substrate comprising, after the die is machined, the step of polishing only the edge to finish the edge of the die to a smoother finish than the rest of the die thereby to reduce the incidence of undesirable streaking defects in the coating wherein the polishing step comprises:

lapping the die edge by traversing the die edge along its length with lapping film by creating relative motion between the die edge and the lapping film while polishing to a degree sufficient to minimize streak formation without overpolishing and rounding the die edge;

during lapping, wetting the edge with oil; and varying the angle of attack of the die edge to the lapping film to allow a complete polish of the edge.

2. The method of claim 1 wherein the polishing step comprises lapping in successive steps of smoother finish.

3. The method of claim 1 wherein the polishing step comprises polishing the edge to a finish of less than 8 microinches.

4. A method of microfinishing the edge of a coating die used for coating a liquid on a substrate, the method comprising the steps of:

grinding the die along its length to minimize formation of a "sawtooth" pattern on the coating edge;

deburring the die component, as needed; and after the grinding and deburring steps, polishing only the edge to finish the edge of the die to a smoother finish than the rest of the die to reduce the incidence of undesirable streaking defects in the coating.

5. The method of claim 4 wherein the polishing step comprises polishing by one of lapping, vapor honing, and grit blasting.

6. The method of claim 4 wherein the polishing step comprises polishing the edge to a finish of less than 8 microinches.

7. The method of claim 4 wherein the polishing step comprises:

lapping the die edge by traversing the die edge along its length with lapping film by creating relative motion between the die edge and the lapping film while polishing to a degree sufficient to minimize streak formation without overpolishing and rounding the die edge; and during lapping, wetting the edge with oil; and varying the angle of attack of the die edge to the lapping film to allow a complete polish of the edge.

8. A coater die for coating a liquid on a substrate comprising an edge that is polished to a finish of less than 2 microinches.

9. The die of claim 8 wherein the edge is finished with a compound angle.

10. The die of claim 8 wherein the edge of the die has a smoother finish than the rest of the die.

11. A coating die used for coating a liquid on a substrate comprising two components located to form a slot therebetween, wherein each component has an edge adjacent the end of the component and forming the exit of the slot, wherein at least one edge has a smoother finish than the rest of that die component thereby to reduce the incidence of undesirable streaking defects in coatings produced by the die on substrates.

12. The die of claim 11 which is one of a slot extrusion coating die, a slide coating die, a curtain coating die, and a fluid bearing coating die.

13. The die of claim 11 wherein the die edges have a finish of less than 8 microinches.

* * * * *